United States Patent
Budil

[19]

[11] Patent Number: 5,963,347
[45] Date of Patent: Oct. 5, 1999

[54] HOLOGRAPHIC NEUROCHIP

[76] Inventor: Matthias Budil, Kobenzlgasse 106, A-1190 Wien, Austria

[21] Appl. No.: 08/765,633

[22] PCT Filed: Jun. 28, 1995

[86] PCT No.: PCT/AT95/00136

§ 371 Date: Dec. 29, 1996

§ 102(e) Date: Dec. 29, 1996

[87] PCT Pub. No.: WO96/00913

PCT Pub. Date: Jan. 11, 1996

[30] Foreign Application Priority Data

Jun. 28, 1994 [AT] Austria ................................ 1273/94
Jun. 27, 1995 [AT] Austria ................................ 1100/95

[51] Int. Cl.⁶ ............................. G02B 5/32; G02B 6/34; G06E 1/00; G03H 1/26
[52] U.S. Cl. ........................ 359/15; 359/107; 359/21
[58] Field of Search .................... 359/15, 11, 29, 359/1, 107, 108, 21

[56] References Cited

U.S. PATENT DOCUMENTS

| | | | |
|---|---|---|---|
| 4,705,344 | 11/1987 | Hinton et al. | 359/15 |
| 4,838,630 | 6/1989 | Jannson et al. | 350/3.7 |
| 4,877,297 | 10/1989 | Yeh | 359/11 |
| 5,007,690 | 4/1991 | Chern et al. | 359/11 |
| 5,061,027 | 10/1991 | Richard | 359/15 |
| 5,093,802 | 3/1992 | Hait | 359/1 |
| 5,101,460 | 3/1992 | Richard | 359/15 |
| 5,170,269 | 12/1992 | Lin et al. | 359/9 |
| 5,212,572 | 5/1993 | Krantz et al. | 359/15 |
| 5,237,434 | 8/1993 | Feldman et al. | 359/19 |
| 5,285,411 | 2/1994 | McAulay | 365/49 |
| 5,321,270 | 6/1994 | Jutamulia et al. | 250/484.4 |
| 5,339,201 | 8/1994 | Nishimura et al. | 359/891 |
| 5,410,468 | 4/1995 | Horinouchi | 369/103 |
| 5,432,722 | 7/1995 | Guilfoyle et al. | 359/107 |
| 5,548,772 | 8/1996 | Lin et al. | 359/11 |
| 5,638,469 | 6/1997 | Feldman et al. | 359/15 |

FOREIGN PATENT DOCUMENTS

| | | | |
|---|---|---|---|
| 0415616A2 | 6/1991 | European Pat. Off. | H03K 19/14 |
| 0653654 | 5/1995 | European Pat. Off. | G02B 6/43 |
| 1360670 | 7/1974 | United Kingdom | G02F 1/32 |
| WO92/15906 | 9/1992 | WIPO | G02B 5/32 |
| WO93/09456 | 5/1993 | WIPO | G02B 6/42 |

*Primary Examiner*—Jon Henry
*Attorney, Agent, or Firm*—Karl Horman

[57] ABSTRACT

The invention relates to an opto-electronic integrated circuit which is optically connected by holograms. An optimum arrangement for as high an integration density as possible of the light sources, detectors, or other opto-electronic components is achieved by light emanating from some of these components of the circuit is reflected back repeatedly and in a point reflected manner onto the circuit by one or more holograms and, selectively and in addition, by optical lenses, with an intensity defined by the hologram, and that the reflected back light impinges partially or totally on components. It is also possible to manufacture a chip which in its interior incorporates a plurality of such structures. On its surface there are provided light sources (2), which radiate light downwardly through the light pervious substrate. On the rear surface of the chip are provided holograms (4) which, in turn, create point reflected images (3) of the light sources on the front surface of the substrate, detectors being there provided which can receive the light from below.

20 Claims, 6 Drawing Sheets

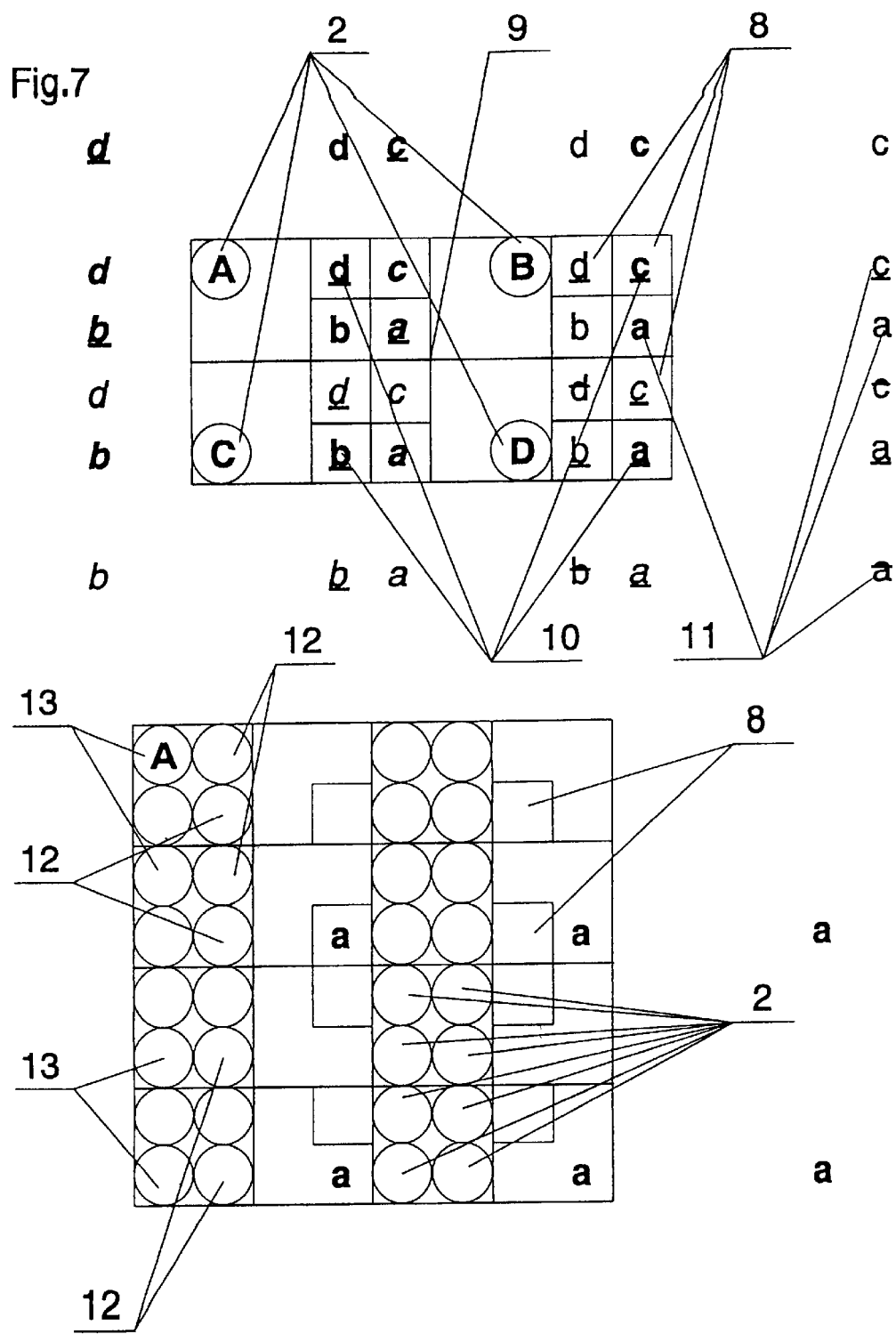

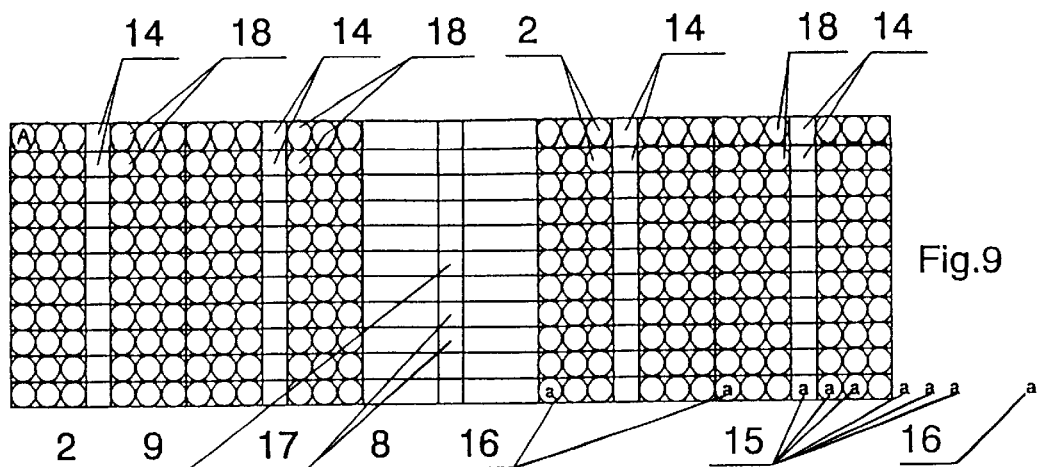
Fig.9
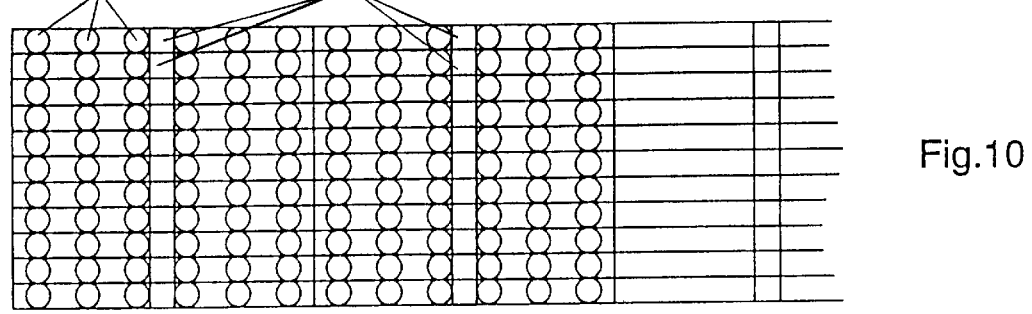
Fig.10
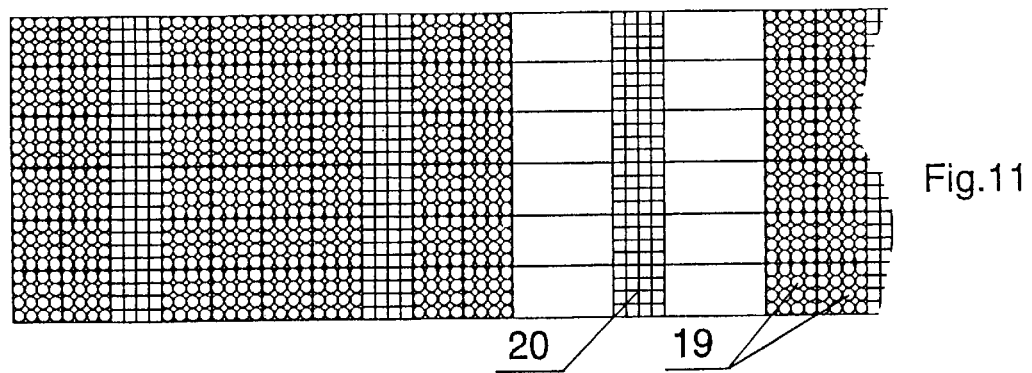
Fig.11
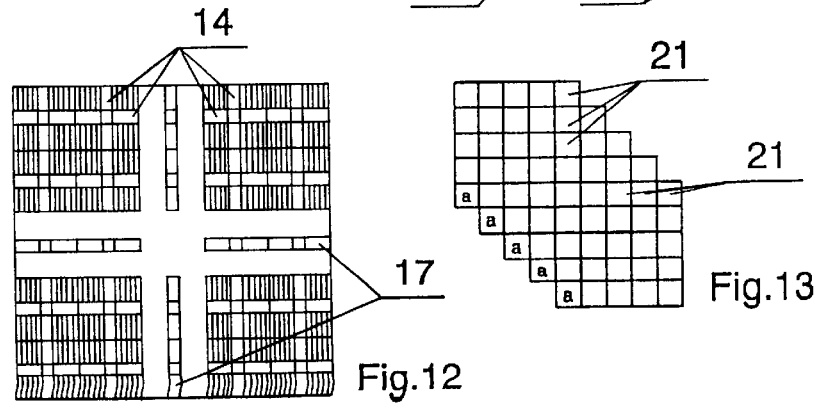
Fig.12
Fig.13

HOLOGRAPHIC NEUROCHIP

CROSS-REFERENCE TO RELATED APPLICATIONS

The present application has been filed pursuant to 35 U.S.C. 371 and is based upon International Application No.: PCT/AT95/00136.

BACKGROUND OF THE INVENTION

1. Field of the Invention

The invention relates to a holographic neurochip, ie., opto-electronic integrated circuit (1) with a substrate surface, which generates a light pattern (2), whereby light rays emanate from some of its optically active components, light rays pass through some of its optically active components and/or light rays are reflected by some of its optically active components so as to generate the light pattern, and with a reflecting hologram which may consist of all kinds of light diffracting structures, such as, for example, reflecting binary or multilevel phase gratings, multilayered holograms, thick holograms or volume holograms, which change wave fronts impinging on them so that images of light points are generated by them alone, with additional lenses and/or additional mirrors, and that the diffraction is created by a localized change of amplitude, of the phase, of the polarization and/or a combination thereof, whereby the light pattern or parts thereof are reflected back to the substrate surface by the hologram (4).

2. The State of the Art

Hitherto opto-electronic circuits have been known which optically interconnect a predetermined arrangement of light sources and detectors utilizing one or more olograms, without, however, considering an optimum arrangement of the light sources and detectors relative to each other. This process would lead to malfunctions, if light sources and detectors are arranged in an integrated manner so that their size and distances amount to several wave lengths of the utilized light. In WO 87 06411 connections have to be formed by extremely complicated wave guides. In U.S. Pat. No. 4,705,344 the connections are formed by an array of holograms. This process allows for small apertures only, so that at a large number of connections the diffraction would result in cross-talk. Moreover, the light rays have to be deflected twice, once to the corresponding hologram element and a second time on the corresponding detector which results in an increase of cross-talk. In U.S. Pat. No. 5, 170, 269 the light rays are even deflected four or more times at similarly small apertures. In all three of the patents the modulation of the light intensities with interference is particularly critical. For that reason, coherent light sources must be used, and the entire arrangement becomes extremely temperature dependent and mechanically complex. In the present arrangement, light rays are only collected and guided to the corresponding detector, whereby with coherent light there may be areas within the surface of a detector which may experience destructive or constructive interference. While this may cause the intensity to change locally, the total sum remains always constant in accordance with the principle of energy conservation and is equal to the sum of the incident partial intensities. In addition, the light rays of all light sources impinge on a single hologram and thus emanate from the light sources, or are received by the detectors, with a large angle light cone. As a result, the aperture of this optical arrangement is particularly large, and a high resolution may be achieved.

OBJECT OF THE INVENTION

It is a task of the present invention to provide an optimum arrangement of the light sources and detectors on a substrate, so that these opto-electronic circuits, which are optically connected by holograms, may be highly integrated.

SUMMARY OF THE INVENTION

The invention solves this task by the light pattern or parts thereof being diffracted by the hologram in one or more orders, whereby the light pattern may repeatedly be imaged by point reflection on the surface of the substrate by the hologram or by an additional lens (5), with intensities defined by the hologram, and by the reflected point mirrored light patterns impinging partially or completely on optically active components, such as, for example, light detectors and/or light modulators, thereby to provide a logic connection of light intensities emanating from one or more points of the pattern.

Moreover, the invention may be realized on a substrate on which there are provided laser diodes or light emitting diodes which radiate light through the substrate in an upward or in a downward direction. In addition, integrated electro-optical modulators may be provided at the substrate which modulate laser light focused by holograms or lenses. The light distribution emanating upwardly or downwardly from the substrate is point reflected several times by optical lenses and holograms, or by holograms only, and is projected from above or below, relatively offset, at a desired intensity onto the surface of the substrate. Furthermore, detectors are provided at predetermined positions on the substrate which receive the light impinging from above or from below. The light may be repeatedly modulated by stractural elements thus being reflected repeatedly by holograms. Additional functions may also activate electronic circuits provided at the substrate.

Particularly compact embodiments of the invention may be obtained if the image forming holograms and optical lenses are provided on the surface of the substrate or within the substrate. Further connections are obtained if the image forming holograms and the optical lenses are provided on or in light pervious layers attached to the front or rear surface of the substrate. Undesirable light rays may be eliminated by stops etched into the substrate or on the layers attached to the substrate. Additionally, a plurality of such opto-electronic circuits may be connected in a sandwich structure, and holograms or optical lenses may project light from one circuit plane to another.

Optically controllable light sources and modulators may also be realized by SEED components (=self electro-optic effect devices) on the substrate which are capable of selectively changing their state electrically or by impinging light.

Neuronal networks may be realized by repeatedly reflecting a uniform light distribution onto the circuit, so that every point of light is projected to the vicinity of every other point of light. Vector-matrix-multipliers are obtained by matrix, linear or columnar light distributions which are repeatedly reflected back to matrix, linear or columnar groups of light detectors.

DETAILED DESCRIPTION OF THE PREFERRED EMBODIMENTS

Figure 1:
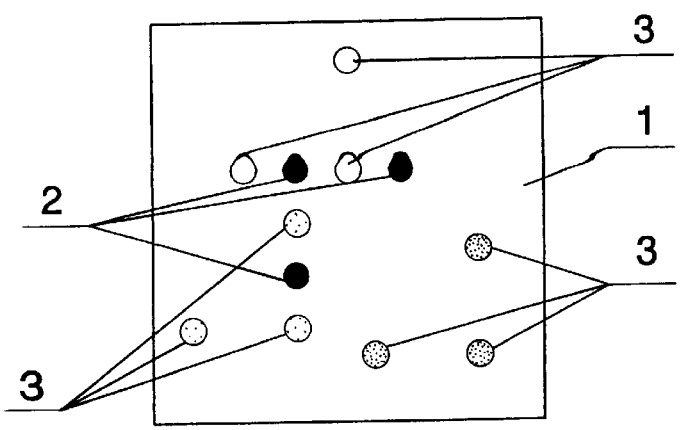

The invention will hereafter be explained in detail on the basis of embodiments depicted in the drawings.

The term hologram as applied to the invention is used for all kinds of light diffraction structures which change wave fronts impinging on them such that images of light points are generated by them alone, with additional lenses and/or with additional reflectors, with the diffraction being generated by local changes in amplitude, phase, polarization, or a combination thereof. Special mention is to be made of line gratings, film holograms, phase gratings, Fresnel lenses, multi-layered holograms, thick holograms or volume holograms. The hologram may also be formed as a filter or polarizer so that it will generate images only at certain wave lengths or polarization planes. Moreover, the hologram may itself act as a reflector if a reflective layer is provided on its surface. Also, holograms are conceivable which act as modulators, that is to say, the intensity of their projections may be varied. This is possible with electro-optical crystals or liquid crystals which change their electromagnetic states as a function of electric fields. Light diffraction structures may be made by electrode structures. The calculation and manufacture of the holograms referred to above for generating images is well known. If no lenses are used, the image forming structures are circles. If lenses are used for projection, the structures are composed of lines.

In FIG. 1 there is schematically shown a substrate 1 including three light sources 2 the light of which is deflected back to the substrate by the reflection hologram thereby generating point reflected images 3 of the light sources. The images may be of different intensities. In FIG. 1, the light source have been depicted as black dots, and their images 3 have been shown as grey and white dots to indicate the possibility of different intensities for each image. The light sources, too, may be of different intensities. In this manner, there is generated in each light point of an image a light intensity which is a product of its associated light source and a multiplication factor defined by the hologram. Light points from different light sources and different images may overlap each other which results in adding of the image intensities. In this manner it is possible to collect light in a detector the total intensity of which is composed of the addition of weighted light source intensities. This property makes it possible to construct networks with a high degree of connection such as may exist, among others, in neuronal networks. In this example, the weights of the network edges (Gewichte der Netzkanten) are positive and are predefined by the hologram. Moreover, any desired logic circuit may be constructed by this method. A number n of equal light sources will project n point reflected images of equal intensity in such a manner that all of the n images of the light sources are projected on a light detector. In this detector, a light intensity is thus generated which is proportional to the sum of the light intensities of the light sources, and if the light sources are switched on and off a binary value will be presented. By means of a threshold logic connected to the output of the detector a logic OR is realized if the threshold logic is selected sufficiently low to generate a logic "one" if only one light source is switched on, or a logic AND is realized if the threshold is selected high enough that a logic "one" is only generated if all the light sources are switched on. It thus becomes possible to realize any kind of logic circuit by means of conventional electronic inverters.

Figure 2:
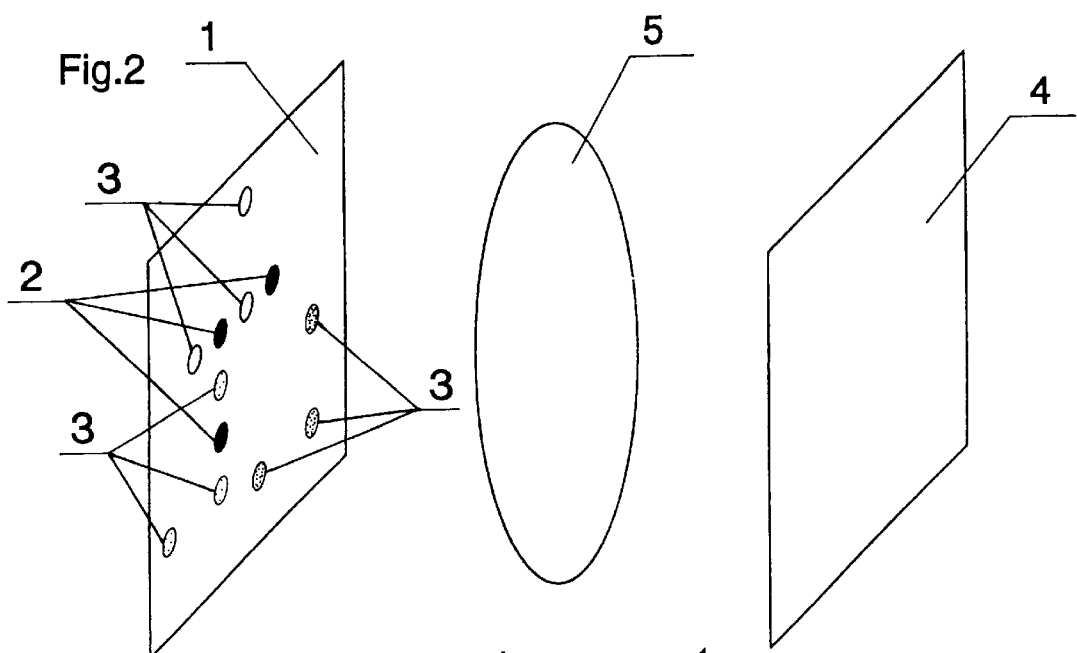

In FIG. 2, the substrate 1 is schematically shown with a hologram 4 and a lens 5, the surface of the substrate being located in the focal plane of the lens. The lens generates a spatial Fourier transformation of the light sources of the substrate. In this case, the hologram consists of overlapping grating lines which generate wave fronts, which, if again Fourier transformed by the lens, will correspond to the images on the substrate. The hologram may also be arranged immediately behind the lens in order to keep any vignetting effect as small as possible.

Figure 3:
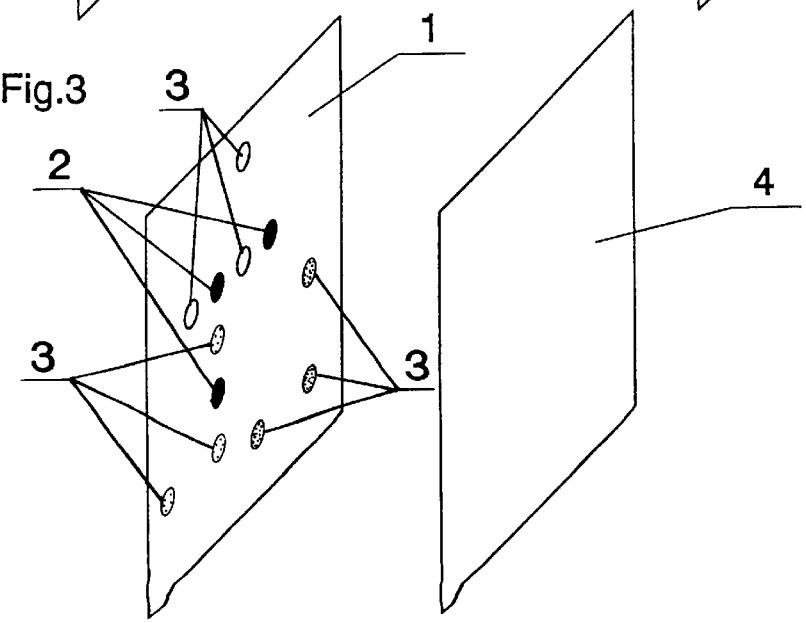

In FIG. 3, the substrate 1 is schematically shown with a hologram 4 which generates images directly, without a lens. In this case, the hologram consists of overlapping diffracting lenses which generate the images on the substrate, with the diffracting lenses being appropriately displaced relative to each other.

The advantage derived from repeatedly projecting the light sources resides in the possibility of using high aperture optics. In this fashion, image distortions resulting from diffraction effects may be kept especially low, and integrated circuits may be used as substrates. A disadvantage to be mentioned is that light point may be generated which are not utilized. An essential factor for the quality of an optical connection is the product of the spatial band width resulting from the square of the ratio of the image diameter to the light point diameter. Because of the high aperture the light points are particularly small, and if complex lens systems including for instance, aspherically ground tenses are used to correct further faulty images, such as, for example, distortions, semi-conductor chips of 10 mm diameter and larger may be interconnected. Binary and multilevel phase holograms may also be used as holograms. If normal holograms or binary phase holograms are used, it is necessary to consider that two images will always be generated. Examples which take advantage of this effect will be set out below.

If semi-conductor laser diodes are used, it need be remembered that the radiated wavelength may vary. In common holograms this would lead to a change in the image. Using thick, multi-layered holograms or volume holograms, any image will remain substantially stable notwithstanding any change in the wave length. Image distortions of the hologram may also be corrected by those measures, where no lens is utilized.

Figure 4:
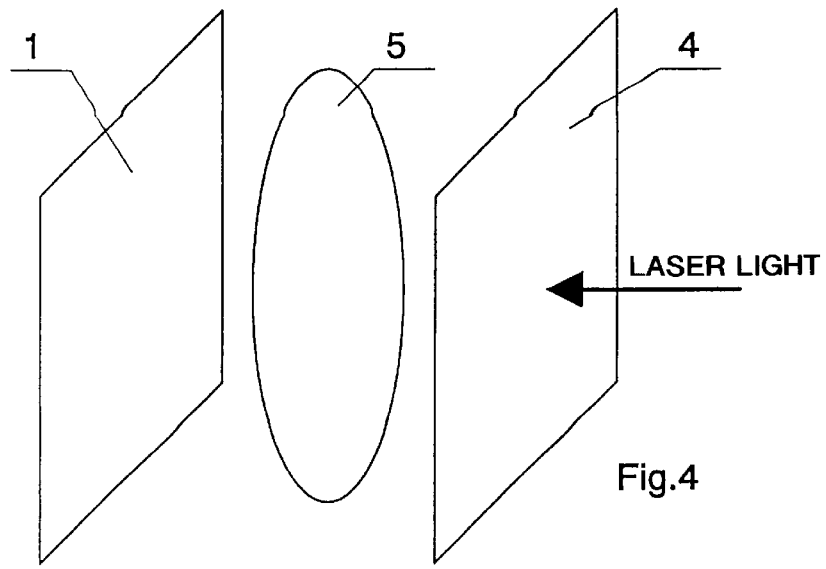

With monochromatic parallel laser light, holograms may be used to generate light points on the substrate. In FIG. 4, there is schematically shown a structure by means of which parallel laser light is focused on a substrate 1 by a hologram 4 and a lens 5. At those positions where the light points are present, there are located opto-electrical components, such as, for instance, multiple quantum well components, which are capable of changing their reflective properties. Because of this, light may in a controlled manner be reflected back from these positions to the hologram whence it is again reflected to the substrate. The hologram is such that some portions thereof operate transmissively and other portions operate reflectively. Those portions which allow passage of light generate light points on the substrate, and those portions which reflect the light generate point reflected images of these light points.

Figure 5:
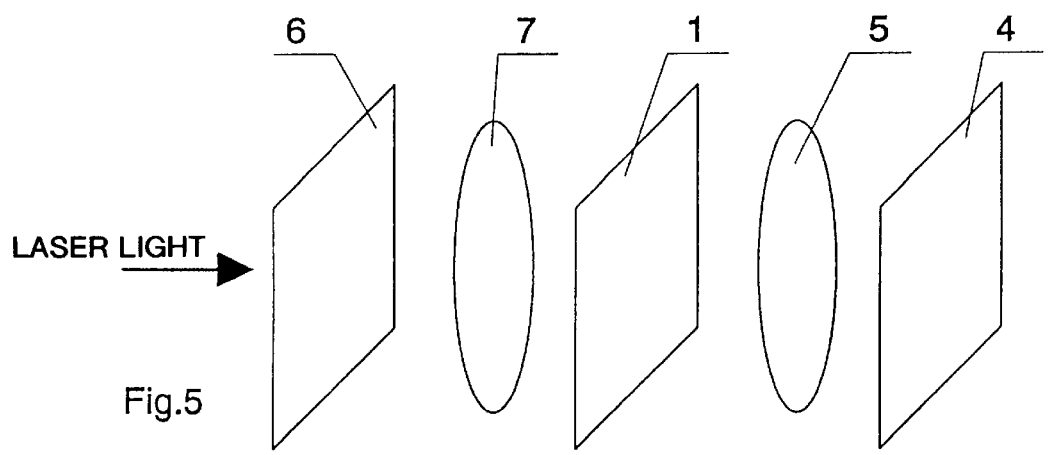

In FIG. 5, there is schematically shown an embodiment in which laser light impinges from the rear surface of the substrate. Behind the substrate, there are a hologram 6 and a lens 7 which focuses the light onto the substrate, the substrate being light pervious at these locations. Opto-electronic components are provided at the substrate at the locations of the light points. These opto-electronic components, such as, for instance, multiple quantum well components, are capable of changing their transmission characteristics. This leads to controlled light sources, the light of which may be optically processed further, as is conventional. The embodiments shown in FIGS. 4 and 5 can only be constructed with holograms derived from diffracting lenses. Another possibility is to modulate the light reflected back from the front hologram with transmission components and to reflect it back to the substrate from the rear hologram as shown in FIG. 4. This requires the detectors to be constructed in such a manner that light may be received from the rear surface of the substrate. In this embodiment, the laser light may also emanate from the front, may twice traverse the substrate and may be reflected back from the front hologram. In such a case, conventional detectors are required which receive the light from the front. It is also possible to conceive of a variant which may be impinged by laser light from the front and from the back. By modulating the light rays twice, variable weights are possible in the network edges.

Figure 6:
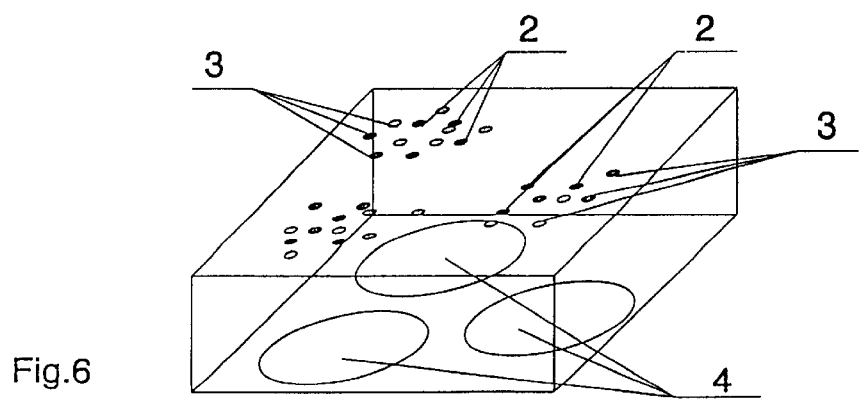

In FIG. 6 there is schematically shown a chip incorporating a plurality of the structures of FIG. 3. On its surface, there are provided light sources 2 which radiate through the substrate in a downward direction. On the reverse side of the chip, holograms 4 are provided which, in turn, generate point reflected images 3 of the light sources on the front surface of the substrate. Detectors which may receive the light from below are provided at the front surface of the substrate. In this structure, the substrate must be pervious to the light used. This structure makes possible logic circuits which are based on the principle of threshold logic, which may be utilized in neuronal networks. The images are generated sufficiently often so that in a detector all light points are imaged once appropriately weighted. If negative weights are also necessary, this process has to be performed twice. The measurement results of the detectors are processed further by electronic circuits, with any negative result being subtracted from a positive one, and a comparator will provide the final result. All logic operations may be performed with the threshold logic. Several such circuits may easily be provided on the chip, since one and the same hologram may be utilized for several logic elements. The size of the hologram is determined by the distance between the rear and front surfaces of the chip. If only a small image area is desired and if the surface of the chip is to be utilized in an optimum manner, the distance between front and rear surfaces has to be shortened. This may be accomplished by etching techniques. Etched lands between individual holograms may serve to prevent cross-talk between individual areas. These lands may be etched out of the front surface as well as the rear surface. The lands in the rear surface offer the advantage that they do not use up any of the space needed for the electronic circuits at the front surface. Also, in a holographic neurochip of this kind, too, laser light focused by holograms or components which change their transmissive properties may be used to provide controllable light sources. In such a case, the laser light emanates from the front and is focused onto the transmission components. Thereafter, it penetrates into the substrate and may be broadened or fanned out, if required, by diffraction micro lenses. The optical light path thereafter acts as if the light source is directly present at the chip. The chip may also be irradiated at its rear surface, in which case the individual areas would correspond to the arrangement of FIG. 4. The holograms focus the light from the rear surface to the components at the front surface. These components, in turn, may change their reflection properties and reflect the light back to the holograms in a dispersed manner. Furthermore, components may be utilized which let the light pass in a modulated manner, and such modulated light will thereafter be reflected back from a hologram to the chip. There, the light will be detected and will penetrate through a modulating component before it is reflected back to the front surface from the holograms at the rear surface of the chip. It is also possible, in the manner of FIG. 5 to focus the light from the rear onto the surface of the chip where it is selectively modulated. It is then reflected back by the hologram at the front surface to the chip where it is again selectively modulated and reflected to the front surface by the holograms at the back surface of the chip. The double modulation of the light make it possible to construct networks with variable edges (variable Kanten). Furthermore, a transparent layer which supports further holograms may be attached to the chip. The chip may also be provided with electronic circuits at its rear surface, and at its front surface it may be provided with holograms. The arrangement may be constructed as a sandwich with the holograms transmitting light between individual layers.

FIG. 7 schematically shows a way in which a neuronal network may be constructed on a substrate by way of the structures explained supra. The light sources 2 are drawn as circles and the detectors 8 are drawn as squares. A capital letter is associated with each light source and each associated image on a detector is identified by the corresponding lower case letter in different fonts. The font is the same for each image of all light sources. In this example, the light sources are projected onto the substrate nine times, in a point reflected manner, with the center of symmetry 9 being in the exact center of the substrate. The image may be generated, for instance, by means of a binary phase grating hologram and a lens. There is only one zero order image 10, and it is shown boldly underlined. All other first order images 11 are symmetrical relative to the zero order image. In a binary phase grating there will always be generated a second first order image which is as far removed from the zero order image as the first first order imager it is, however, inverted. In the present example, this is desirable. All of the individual light points of the light sources are here generated adjacent to a light source. This ensures transmission of each intensity value into the vicinity of each light source, so that a fully interconnected neuronal network may be set up. In this example, the weights are electronically evaluated, the resulting values are electronically added, and a value is non-linearly assigned to the result and passed on to the corresponding light source. In this example, the interconnection is established entirely optically, and the calculation is performed in an analog manner and in situ. It is possible also to construct digital networks in which a plurality of light sources and detectors are assembled in groups representing a digital number. Such a digital variant of an optical computer is schematically depicted in FIG. 11.

The embodiment schematically shown in FIG. 8 is similar to the one of FIG. 7. except that it performs the addition optically. In this embodiment, there are provided eight light sources 2 and two detectors for each cell, so that negative weights may also be considered. The ninefold projection of the light sources is clearly defined by the image of the left upper light source "A" at the site marked by a lower case "a". Each cell is provided with light sources associated with another cell 12 or the same cell 13, one of them transmitting negative values and the other one transmitting positive values. The detectors are displaced such that they can collect the light for the associated cell and of the related sign. The end result is generated by the electronic subtraction of the two detectors. The two variants of FIGS. 7 and 8 may also be combined so that multiplication as well as addition are performed optically. In that case, light emanates from each cell, arrives at each cell as in FIG. 7, where instead of the detectors there may be provided opto-electronic components capable of changing their reflective properties. The light is diffusely reflected from the cells, and, as in FIG. 8, impinges again on a detector. In this instance, too, signs have to be considered by multiple performance.

FIG. 9 schematically shows a vector adder which adds vectors in an analog manner, in two steps. The vectors are applied to the light sources 2, each light source slot representing a vector. The vectors are added in two steps. At first, the partial results are collected in detectors 14 provided for this purpose. To this end the images 15 of the light sources are shifted thrice by one cell to the left and to the right relative to the center of symmetry 9 which is the center of the arrangement. These shifts serve to collect the partial results in the detectors 17 for the total result. In the first step, the inner light sources 18 adjacent to the partial result detectors are not utilized or else their intensities would be received in undesirable detectors. The partial results thus are generated in the partial result detectors 14 in a point reflected manner relative to the center. These results are then passed on to the inner adjacent light source slots 18 and the end result is then generated in the center detector cell again leading to a point reflection so that the end result has the same direction as the original vectors. The twofold addition also ensures that not too many projections are required which would be of correspondingly low light intensity. A similar variant is shown in FIG. 10 in which light is schematically prevented from again impinging on light sources 2 by displacing the light sources by two cells whereas the light is shifted by an uneven number of cells so that it may impinge upon a detector 8. This may be of advantage when reflective components are utilized. Furthermore, cross-talk is reduced by diffraction effects between the cells. FIG. 11 schematically depicts a digital variant of the optical adder. The numbers in this example are represented by light source fields 19 measuring 4×4. Numbers 16 bits long or a partial result of a multiplication of four bit long numbers may be displayed therein. The partial results are generated by multiplying each digit of one number with each other digit of the other number. Values of intensity will then be generated in the center detector strip 20 which may be evaluated by analog-to-digital converters and which then must be added in correspondence with their digit value in order to provide the end result. This method allows the construction of vectormatrix multipliers.

FIG. 12 schematically depicts an optical computer in which even the transposed matrix may be multiplied with a vector. This is accomplished by displacing the images not only to the left and to the right, but also upwardly and downwardly. In other respects, the computer is structured like the above examples. Again, point reflected partial results are generated in the detectors 14 provided for this purpose, and the end results are collected in the detectors 17 in the center. The multiplication of the vector elements with the matrix elements stored at each cell is performed locally at each cell and may in part also be optically performed (FIG. 13), for which purpose the holograms may be provided at the rear surface of the substrate, as shown in FIG. 6. The advantage of such a computer resides in the fact that it is well suited for models of neuronal networks. If the back propagation algorithm is utilized the data vectors may, for instance, be arranged vertically, and the difference vectors may be arranged horizontally. The vectors may be electrically applied to the cells by vertically and horizontally disposed leads, or optically by methods similar to those described above. In that case corresponding detectors are required at each cell. At the same time, the outer product of data vectors and difference vectors is required for changing the matrix elements in accordance with a learning set, whereby the result is a matrix again. The matrix may be locally evaluated at each cell and may be added to the associated matrix element. In multi-layered networks it is possible to cascade a plurality of such arrangements.

FIG. 13 schematically depicts the manner in which a matrix intermediate result derived by multiplying each digit of a number with each other digit of another number can be evaluated by optical methods. The image of the matrix intermediate result is overlapped in a diagonally displaced manner by one cell for each digit of the numbers. This is indicated in FIG. 13 by marking the lower left corner with an "a". The end result which is evaluated by analog-to-digital converters is then generated in the center column 21, and these numbers will then be electronically added in accordance with their position.

Figure 14:
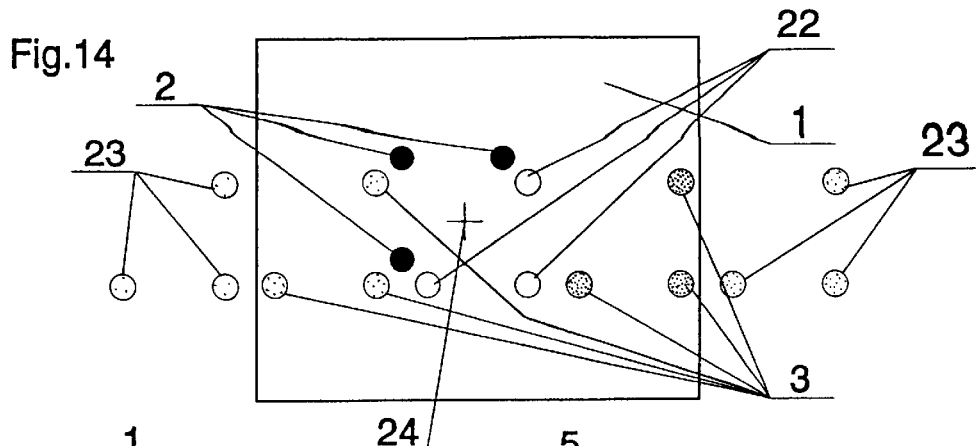

Hereafter, the problem of undesired images is to be solved. By utilizing holograms as image forming elements light rays may be generated which do not contribute to the function of the circuit. In FIG. 14, there is schematically shown a light pattern which includes two images of the light sources displaced by the same distance relative to the direct projection 22 point reflected around the optical axis 24. The direct point reflected projection 22 of the light sources becomes a zero first order image and the other two projections are called first order images. In addition, higher order images 23 are shown which are displaced by whole number multiples of the distance of the first order images from the zero order images. However, in this case they are undesired and are not projected onto the substrate 1 on which the circuit is provided. The depicted light pattern is generated by using a hologram which a Henuates only the amplitude of the light rays which have been Fourier transformed by a lens, such as, for instance, a film hologram, or which changes the phase only of these light rays, such as, for instance, a binary or multilevel phase grating. The higher order images are generated in particular by the use of holograms if they can modulate the light in two ways only, for instance if the hologram reflects, or does not reflect, the light in dependency of the location, or if it rotates the phase in dependency of the location by 0° or by 180°. The holograms referred to have to be mirrored at their rear surface, or they have to be placed behind a mirror, so that the light rays may be reflected back to the circuit. Moreover, the hologram may be realized by a mirror, the reflective surface of which has been etched to provide a pattern, such as, for instance, a line grating, with the etched areas not reflecting the light.

Figure 15:
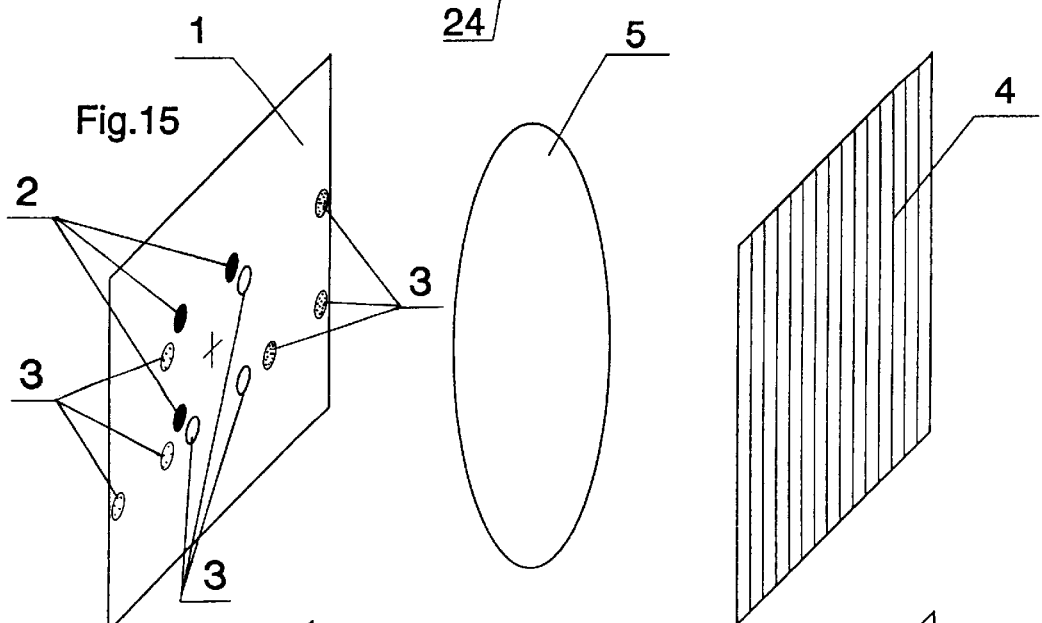

FIG. 15 schematically depicts the substrate 1 described in connection with FIG. 14, together with a hologram 4 and a lens 5 with the surface of the substrate being positioned in the focal plane of the lens. The lens provides a spatial Fourier transformation of the light source of the substrate. The hologram here shown is a line grating which generates wave fronts which correspond to the images on the substrate once they are again Fourier transformed by the lens. In the present example the undesired higher order images are not projected onto the circuit. Their light rays may additionally be interrupted by stops (not shown) to prevent them from impinging upon adjacent circuits. The zero order image may in this example be found on the circuit. By arranging the optical axis 24 asymmetrically, the zero order image may be removed from the circuit. Undesired images may always be removed by displacement of the desired first order image by an appropriately dimensioned distance. As a consequence, the other images will be displaced by opposite double or multiple distances and will no longer cause disturbances. The higher order images may also be combined with first order images of other projections, without causing any disturbance, provided their intensity is taken into consideration when arranging the hologram. Undesirable images may also be generated by the projection of images which have already been projected which may be suppressed by making the light detectors and other locations at which light points are generated light absorbing.

Figure 16:
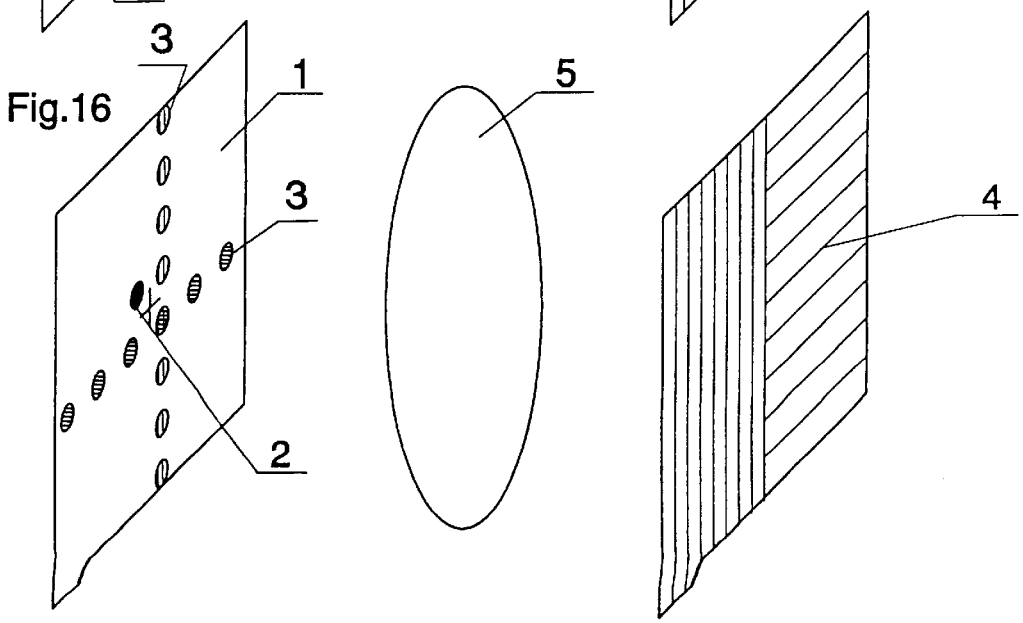
Figure 17:
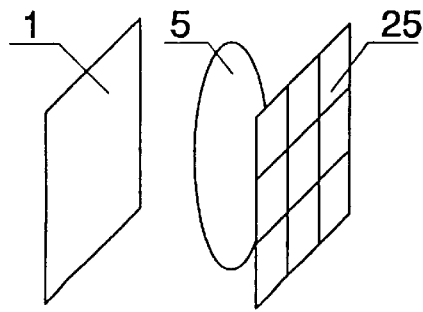
Figure 18:
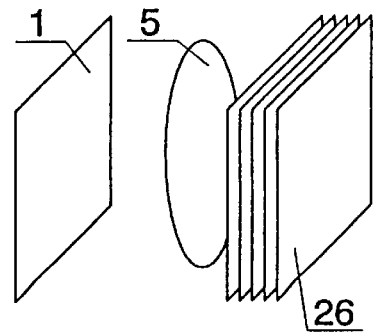

As schematically shown in FIG. 16, polarizers offer another possibility of filtering out undesirable light points. In FIG. 16, a light source 2 is provided at the substrate the light of which is repeatedly reflected back to the substrate 1 by means of a hologram made up of two line gratings disposed vertically relative to each other. Two polarizer, the polarization axes of which are also disposed vertically relative to each other, are disposed in front of the line gratings. In this fashion light emanating from light points generated by one of the line gratings is effectively prevented from being reflected back by the other line grating. Both polarization axes are present in the zero order image, whereas only the related polarization axis is present in the other images. FIG. 17 schematically depict a variant in which a plurality of partial holograms 25 are utilized. Filters, polarizers or modulators may be placed in front of these partial holograms so that light from sources of different wave lengths or different polarization axes is differently deflected so that connections may be switched on or off by the modulators or may be differently weighted. The disadvantage of this variant is that the aperture for each partial hologram becomes correspondingly small so that the density of integration of the light sources and detectors cannot be as high as in the embodiment of FIG. 15. This disadvantage may be overcome by arranging the holograms 26 in succession, as shown in FIG. 18. In that case, the holograms must consist of filter material or polarizing material, so that these holograms either filter out or transmit the light in dependency of the location, or polarize or transmit the light. Moreover, the modulators must also function as a hologram. This may be accomplished by structuring the analyzer of a Pockels cell as a hologram, with the analyzer then either a henuading or transmitting the light rays in dependency of the location. The light ray will have been polarized by the polarizer and modulated in the direction of polarization by the electro-optic crystal. By applying a voltage to the electro-optic crystal, the hologram may be switched on and off. Another possibility of structuring a variable hologram resides in depositing an array of parallel electrodes on an electro-optic crystal and to apply a voltage pattern thereto for the purpose of generating different holograms by means of the electro-optic effect. Of course, the array of electrodes also generates a hologram; however, the spatial frequency of the parallel structure may be chosen so high that its first order images are not projected onto the circuit. The advantage of such a hologram modulator resides in the possibility of arranging a plurality of them in succession.

Figure 19:
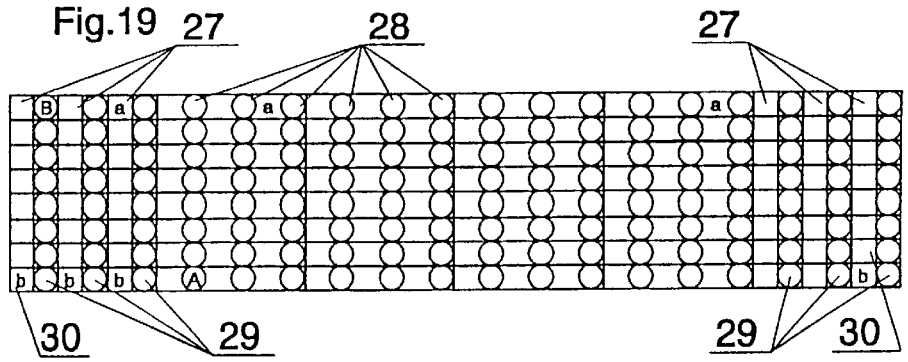

In FIG. 19 there is schematically shown a vector adder in which undesirable higher order images are not projected onto the circuit. It adds vectors in two steps, similar to the embodiment of FIG. 9. Initially partial results of the two halves of the circuit to the left and to the right of the center of symmetry are collected in detectors 27 provided for that purpose. To this end, there are two images displaced to the left and identified by lower case letters "a" There are also two images which are symmetrically displaced to the right relative thereto, but not shown here. With a zero order image, the point reflection will displace the light of the left light source 28 to the right, and vice versa. The light source designated "A" is projected to the location marked by the right lower case "a". No optical components are present at the projection sites of the zero order images. If film holograms are used, these sites should be structured to be absorbent to prevent the dissemination of interfering images. The zero order image may also be suppressed by a binary or multilevel hologram. Because of the shifting or displacement the vectors will be at the same side from which they have been transmitted, except that their elements are now arranged invertedly. The displacement is sufficiently large to prevent projection of second order images onto the circuit. Thus, intermediate results are collected in the detectors. The intermediate results are subsequently applied to the outer light sources 29 which because of the displacements marked "b" are then collected in the outer rows of detectors. If the zero order image is present, the right and left portion-of this operation have to be performed in succession to prevent the operations from interfering with one another. The end result is then obtained by electronic addition of the two intermediate results in the outer rows of detectors 30.

Figure 20:
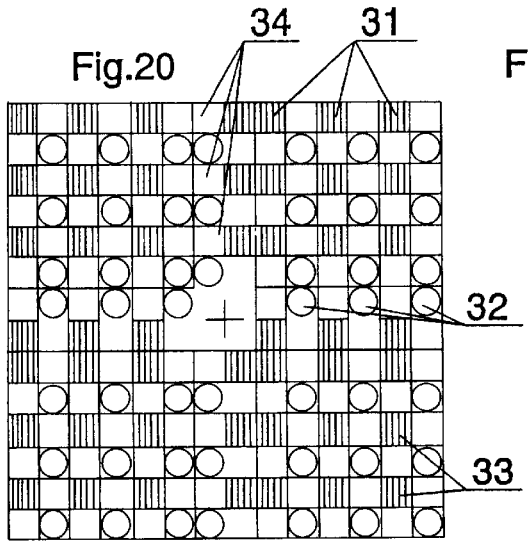

FIG. 20 schematically depicts an optical computer which is similar to the one of FIG. 12. It is suitable for neuronal net-works. In this example, the calculation is performed in one step with three displacements each to the left, to the right, and upwardly and downwardly. The displacements are provided by two line gratings which are disposed normal to each other (FIG. 16) and which are provided with polarizers the polarization axes of which are aligned vertically relative to each other. The matrix elements are arranged in a point reflected manner relative to the vectors. For the zero order image there are provided absorbing areas 31 at the individual cells. At each cell there is provided an electronic multiplier, an electronic adder and a storage. The multiplier serves to calculate the outer product and to multiply the vector elements with the matrix elements. The adder adds the result of the outer product to the matrix elements. To derive the outer product, the vectors are applied to the two rows of light sources 32 and their elements are point reflected and received in a displaced manner in the corresponding detectors. To form the vector-matrix or the vector-transposed matrix product the vector is applied to one of the two rows of light sources 32 and optically transmitted to the cells. Multiplication with the matrix elements takes place there, and the result is applied to the matrix light sources 33. By optical addition, the result may be found in the row of detectors 34 which is associated with the other row of light sources. In this example, the higher order images are of no effect because they either coincide with other first order images or are not projected onto the circuit. The advantage of this arrangement is that the learning set of a back propagation algorithm may, for instance, be applied locally without any necessity of individual matrix element having to be addressed by leads from the exterior. The arrangement may also be digitally structured, in which case each element would be represented by several light sources and signs may be taken into consideration by treating positive and negative numbers separately.

Figure 21:
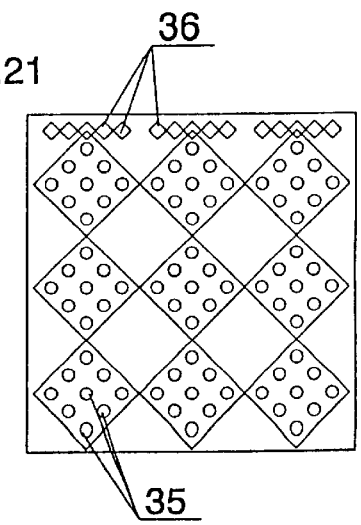

In FIG. 21 there is schematically depicted a vector-matrix-multiplier capable of processing three-digit binary numbers and which can add intermediate results of the bit-by-bit multiplication in each matrix element which are represented by the light sources 35 similar to FIG. 13, as well as add up the matrix elements. The embodiment is especially well suited for very rapid vector-matrix-multiplications. If the matrix is already stored, the multiplication may be performed in one step at any site. The addition is performed optically and the evaluation of the result in the detectors 36 need be performed only for each resultant vector element. Here, too, it is to prevent interference of higher order images.

In all of the above example errors of distortion may be balanced by displacement of the detectors and of the modulating components. The space required therefor has to be taken into consideration when designing the chip. Also, the detectors have to be sufficiently large to ensure detection of the entire diffraction disc and prevent interference phenomena which may distort detection results, particularly in the context of coherent laser light and addition of several images. SEED (self electro-optic device) components the state of which may be optically changed or stored, may also be utilized. The proposed chip may operate in an analog as well as in a digital manner without any necessity to use the binary number system.

What is claimed is:

1. An opto-electronic integrated circuit, comprising:

means for forming a substrate provided with a plane having a substrate surface therein;

means for forming at the substrate surface a plurality of source light points arranged in a predetermined pattern;

means for forming at the substrate surface at least one light receiving component;

means for forming a hologram in superposed relation over the substrate surface at a predetermined spacing therefrom for rendering at the plane a plurality of image patterns each comprising a plurality of image light points as mirror images of the predetermined pattern of source light points, wherein the at least one light receiving component receives light from at least one image light point.

2. The circuit of claim 1, wherein the means for forming a hologram renders the plurality of image patterns on the plane by reflection and diffraction.

3. The circuit of claim 2, wherein each of the source light points emits a large angled cone of light.

4. The circuit of claim 3, wherein the means for forming the source light points comprises at least one of a plurality of optically active components for emanating light rays, a plurality of optically active components pervious to light rays, and a plurality of optically active components for reflecting light rays.

5. The circuit of claim 4, wherein the means for forming the hologram comprises reflecting binary phase gratings.

6. The circuit of claim 4, wherein the means for forming the hologram comprises multilevel phase gratings.

7. The circuit of claim 4, wherein the means for forming the hologram comprises at least one light polarizing means.

8. The circuit of claim 1, wherein the means for forming a hologram is provided with means for locally varying the light received from the source light points.

9. The circuit of claim 8, wherein the image patterns are connected for electronic logic functions.

10. The circuit of claim 1, further comprising lens means intermediate the substrate surface and the means for forming a hologram.

11. The circuit of claim 1, further comprising light stop means intermediate the substrate surface and the means for forming a hologram.

12. The circuit of claim 1, wherein the means for forming a hologram comprises a plurality of such means in a side-by-side arrangement.

13. The circuit of claim 1, wherein the means for forming a hologram comprises a plurality of such means arranged one behind the other.

14. The circuit of claim 8, wherein the means for forming a hologram comprises means for varying the localized change in the wavefront affected on the light of the source light points for providing variable optical connections.

15. The circuit of claim 1, wherein the substrate comprises a semi-conductor crystal material provided at opposite surfaces with optically active components comprising at least one of laser diodes, light emitting diodes, multiple quantum well means, integrated electro-optic modulators, SEED's for emitting light and for modulating impinging light.

16. The circuit of claim 1, wherein the means for forming a hologram is provided on the substrate surface.

17. The circuit of claim 1, wherein the substrate surface is provided with a light pervious layer and wherein the means for forming a hologram is provided integral with the layer.

18. The circuit of claim 1, wherein a plurality of circuits are provided in a sandwich arrangement and wherein means is provided for transmitting and reflecting light between the plurality of circuits.

19. The circuit of claim 1, wherein light is repeatedly reflected to the substrate surface for projecting each other light point to adjacent each light point.

20. The circuit of claim 1, wherein the light is reflected in at least one of matrix, linear and columnar distribution patterns.

* * * * *